July 23, 1946.  N. BREWER  2,404,361
ROTAMETER
Filed April 27, 1943   3 Sheets-Sheet 1

INVENTOR.
Nathaniel Brewer
BY Leonard L. Kalish
Attorney

July 23, 1946.  N. BREWER  2,404,361
ROTAMETER
Filed April 27, 1943  3 Sheets-Sheet 2
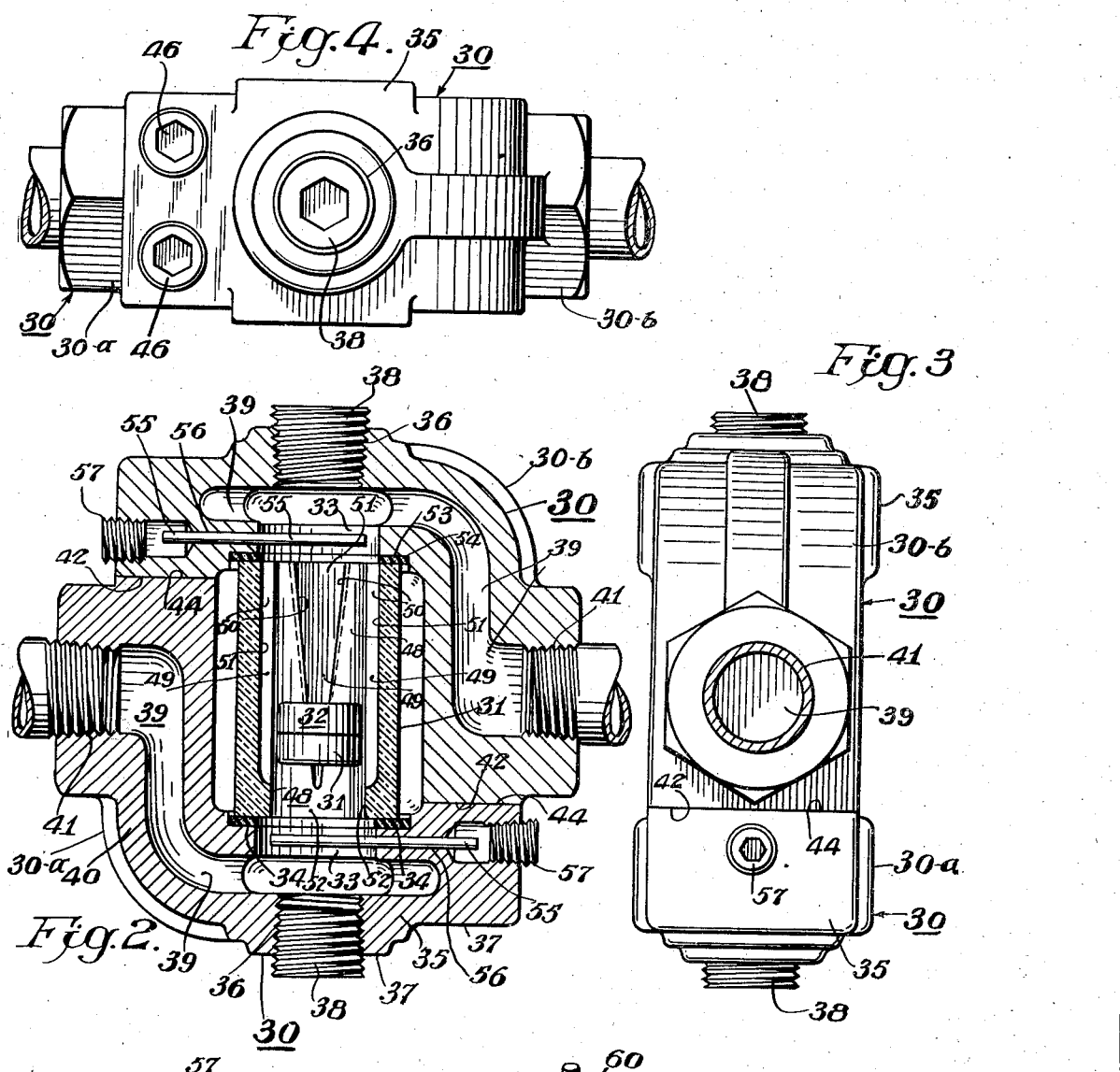
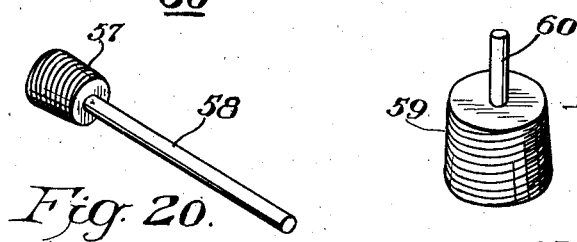
INVENTOR.
Nathaniel Brewer
BY Leonard L. Kalish
Attorney

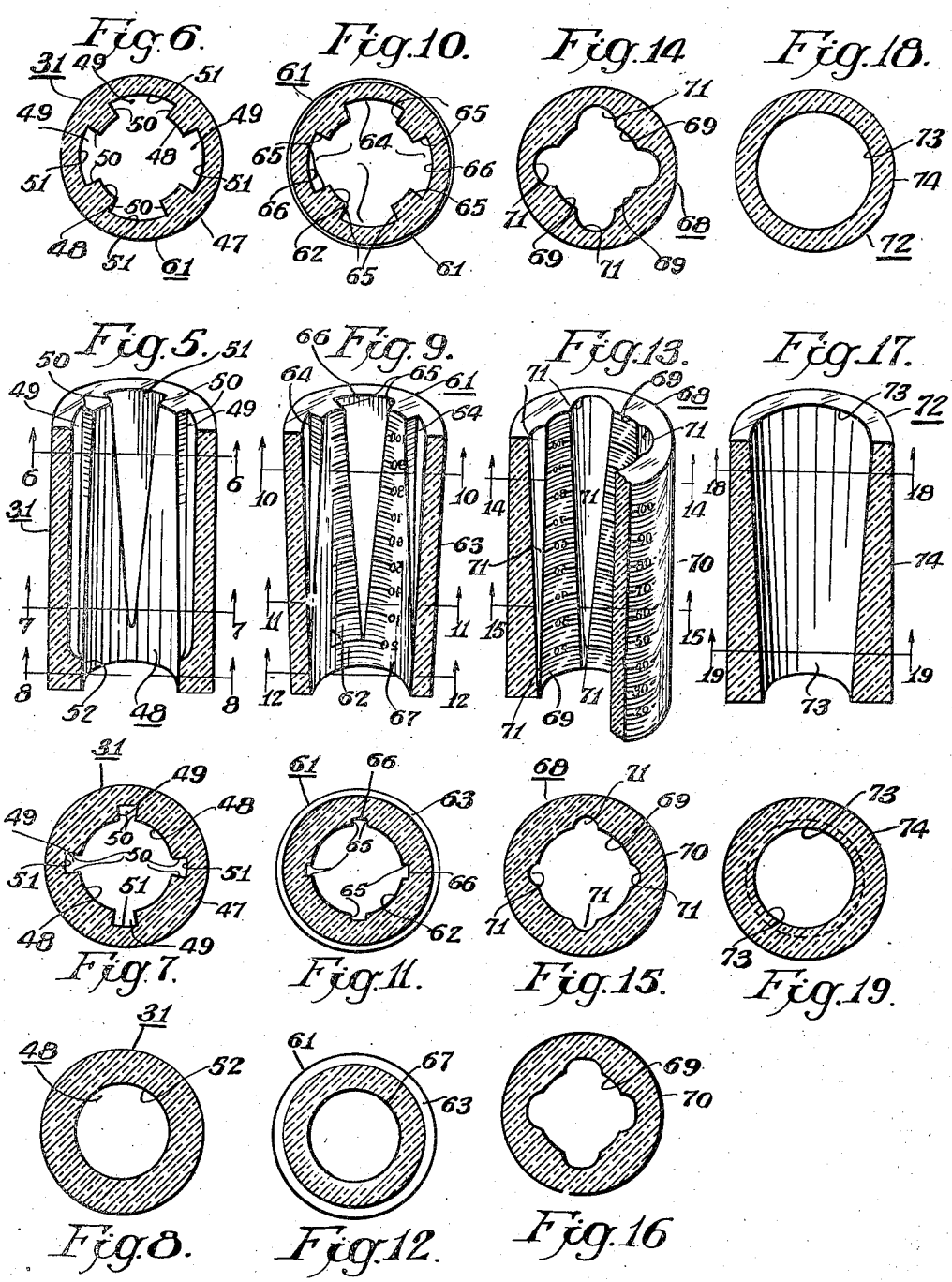

Patented July 23, 1946

2,404,361

UNITED STATES PATENT OFFICE 2,404,361

ROTAMETER

Nathaniel Brewer, Hatfield, Pa., assignor to Fischer & Porter Company, Hatboro, Pa., a corporation of Pennsylvania Application April 27, 1943, Serial No. 484,710

11 Claims. (Cl. 73—209)

The present invention relates to flow-meters and it relates more particularly to flow-meters of the type commonly referred to as rotameters in which a generally vertical metering chamber having vertically varying cross-sectional area is provided with a vertically movable "float" or sinker; the position of the float within the chamber determining the size of the orifice available for vertical flow of fluid through the chamber and being a measure of the rate-of-flow.

An object of the present invention is to provide a simple, inexpensive and durable rotameter which can be installed in conventional pipe lines or the like. Another object of the present invention is to provide a rotameter, the frame of which is made up of two identical and interchangeable parts. Still another object of the present invention is to provide a rotameter in which the "heads" for connection to the ends of the metering chamber are adapted to be held in spaced relationship to each other without the use of spacing bolts or columns. A further object of the present invention is to provide a rotameter, the frame or housing of which consists of two identical and interchangeable castings which can quickly and easily be assembled and dis-assembled by means of simple bolts or the like. Another object of the present invention is to provide a rotameter in which the metering tube is held between the "heads" of the frame solely by endwise compression and in which fluid-tight seals are provided between the ends of the metering tube and the heads solely by end-wise gasketing. A further object of the present invention is to provide a rotameter in which the sealing pressure required for maintaining fluid-tight seals between the ends of the metering tube and the "heads" is supplied by the fastening means employed to connect the parts of the rotameter frame to each other. Another object of the present invention is to provide a rotameter having inlet and outlet openings in the upright portions of the frame. A further object of the present invention is to provide a rotameter in which the frame is provided with conduits leading from the upper and lower "head" portions thereof through the upright portions and terminating in generally horizontally extending inlet and outlet openings disposed generally intermediate the ends of the vertical metering tube. Still another object of the present invention is to provide a rotameter which can be installed directly into a horizontal pipe line.

Other objects and advantages of the present invention are apparent in the following specification, appended claims and accompanying drawings.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

In the accompanying drawings in which like reference characters indicate like parts throughout:

Figure 2 represents a vertical cross-sectional view of the embodiment shown in Figure 1 in assembled position.

Figure 3 represents an end elevational view of the embodiment of Figure 2.

Figure 4 represents a plan view of the embodiment of Figure 2.

Figure 5 represents a view partly in vertical cross-section and partly in perspective of the metering tube shown in Figures 1 and 2.

Figure 6 represents a horizontal cross-sectional view generally along the line 6—6 of Figure 2.

Figure 7 represents a horizontal cross-sectional view generally along the line 7—7 of Figure 2.

Figure 8 represents a horizontal cross-sectional view generally along the line 8—8 of Figure 2.

Figure 9 represents a view similar to that of Figure 5 but showing a modified form of metering tube in which the angle-cut flutes are given a downwardly-diminishing radial depth and in which the outside of the tube is made conical.

Figure 10 represents a horizontal cross-sectional view along the line 10—10 of Figure 9.

Figure 11 represents a horizontal cross-sectional view generally along the line 11—11 of Figure 9.

Figure 12 represents a horizontal cross-sectional view generally along the line 12—12 of Figure 9.

Figure 13 represents a view similar to that of Figure 5 but showing a further modified form of fluted metering tube in which the flutes are rounded instead of being angle-cut as in the embodiments of Figures 5 and 9.

Figure 14 represents a horizontal cross-sectional view generally along the line 14—14 of Figure 13.

Figure 15 represents a horizontal cross-sectional view generally along the line 15—15 of Figure 13.

Figure 16 represents a cross-sectional view similar to that of Figure 14 but showing a tube having tapered flutes which are generally elliptical in cross-section.

Figure 17 represents a view similar to that of Figure 5 but showing an unfluted metering tube having a conical or tapered inner bore.

Figure 18 represents a cross-sectional view generally along the line 18—18 of Figure 17.

Figure 19 represents a horizontal cross-sectional view generally along the line 19—19 of Figure 17.

Figure 20 represents a perspective view of a stop pin alternative to that shown in Figures 1 and 2.

Figure 21 represents a perspective view of another modified form of stop pin.

Figure 1:
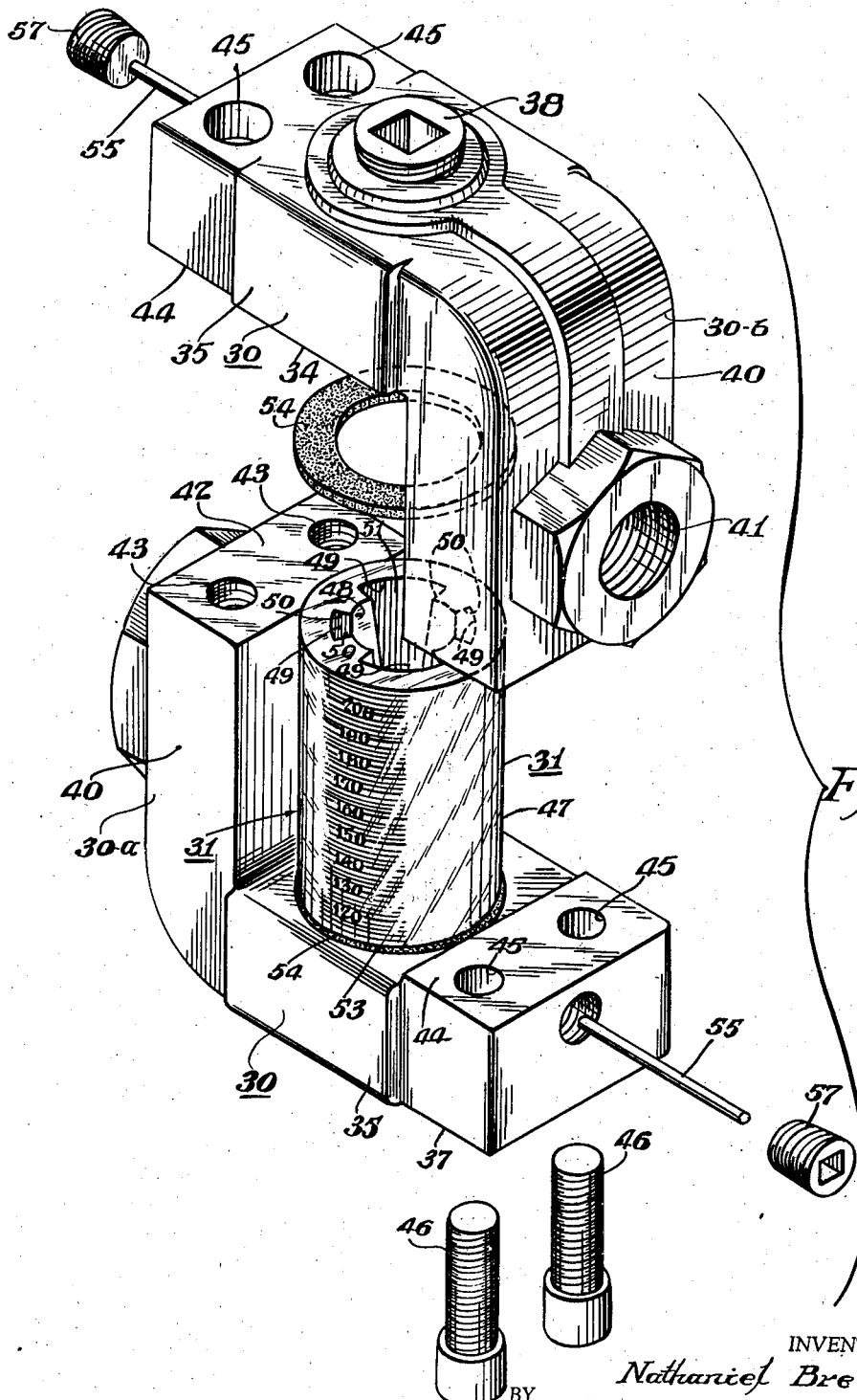
Figure 1 represents a perspective view of one embodiment of the present invention as it appears when disassembled.

In the embodiment shown in Figures 1 to 8, I may provide a rotameter having a frame or housing formed of two symmetrical interchangeable elements which are designated generally by the reference character 30. The housing elements 30 are generally L-shaped as shown particularly in Figure 1 and are adapted to be detachably connected to each other to form the generally rectangular rotameter frame or housing. When the elements 30 are so connected, the lower one constitutes the inlet housing element which is designated more particularly as 30—a while the upper one constitutes the outlet housing element which is designated more particularly as 30—b.

The housing elements 30 are adapted to support, and to provide communicating conduits to, the ends of a transparent vertically disposed metering tube 31 having a metering float 32 adapted for free up-and-down movement therein.

Each of the housing elements 30 is provided with a centrally-disposed opening 33 extending from the inner face 34 of the base 35 of the L and forming a "head" portion of the rotameter frame or housing. A screw-threaded opening 36 extends in alignment with, and in continuation of, the opening 33 to the outer face 37 of the base 35. The opening 36 is adapted removably to receive a screw-threaded plug 38.

A conduit 39 extends within the housing element 30 from the central opening 33 thereof through the upright portion or arm 40 of the L and terminates in an outwardly-extending screw-threaded opening 41 in the upright portion 40.

The end wall 42 of the arm 40 is provided with a pair of inwardly-extending screw-threaded sockets 43 whose function will be hereinafter described.

The end of the base 35 is provided with a smooth slightly raised inwardly-extending seating surface 44; a pair of drilled openings 45 extending through the base 35 from the outer face 37 thereof to the seating surface 44.

The openings 45 and the sockets 43 are symmetrically disposed on either side of the central transverse plane of the housing member so that a pair of headed screw-threaded bolts 46 can be inserted through the openings 45 of the housing element 30—a, as indicated in Figure 1, and fastened within the sockets 43 of the inverted element 30—b; the outer ends of the openings 45 being preferably enlarged to permit the bolts 46 to be counter-sunk and to be generally flush with the outer face 37 of the base 35 when fully screwed in.

A similar pair of bolts can be inserted through the openings 45 of the upper inverted housing element 30—b and can be fastened within the screw-threaded sockets 43 of the lower element 30—a. When the two pairs of bolts 46 are tightened, the end wall 42 of each of the housing elements 30 is held firmly against the seating surface 44 of the other of the housing elements 30 to provide the assembled generally rectangular rotameter frame or housing.

A relatively short thick-walled rotameter tube is adapted to be held in an upright position between the housing elements 30. One form of metering tube which may be used with the rotameter of my present invention is the tube 31, shown in Figures 1, 2 and 5 which is the subject of my copending application Serial No. 484,711, filed April 27, 1943, Patent No. 2,377,861, granted June 12, 1945.

The metering tube 31 which is adapted to be held in upright position between the housing elements 30 is a relatively short, thick-walled transparent tube which is usually of glass (but which may be of transparent synthetic plastic or other suitable material).

The metering tube 31 has a cylindrical outer surface 47 and is provided with a generally cylindrical inner bore 48 within which the cylindrical metering float 32 (or any other conventional type of metering float) fits with a relatively close annular clearance as shown, for example, in Figure 2.

A plurality (as for example 4) of flutes 49 are circumferentially disposed around the inner bore 48 and extend generally axially of the tube 31. Each of the flutes 49 is formed by radially-extending plane side walls 50 and a circumferentially extending curved back wall 51. The back walls 51 are formed as segments of a cylindrical surface whose center of curvature lies at the axis of the tube so that the flutes 49 have the same radial depth throughout their axial length. The side walls 50 converge downwardly so that the flutes 49 have a relatively large circumferential dimension at the top of the tube 31 (at which point the cylindrical inner bore 48 of the tube 31 is reduced to four small portions intermediate the flutes as shown in Figure 6) and so that the flutes terminate at the point of intersection of the side walls 50, somewhat above the lower end of the metering tube 31. Slightly above the lower ends of the flutes 49, the inside of the tube 31 would have the appearance shown in Figure 7 in which the cylindrical bore 48 occupies most of the periphery with the flutes 49 occupying only very small portions of the periphery. The lowermost portion 52 of the tube 31 (below the lower ends of the flutes 49) has a wholly cylindrical inner bore as shown in Figure 8.

The tube 31 is adapted to be positioned intermediate the lower housing element 30—a and the inverted upper housing element 30—b with the inner bore of the tube communicating with the central openings 33 in the housing elements.

A generally circular gasket-seat 53 is formed upon the inner face 34 of the base 35 of the housing element surrounding the opening 33 therein. A pair of similar apertured compressible sealing gaskets 54 are disposed upon the gasket-seats 53 and are adapted to provide a fluid-tight seal intermediate the ends of the metering tube 31 and the housing elements 30—a and 30—b when end-wise pressure is exerted upon the housing elements.

The dimensions of the several parts of the rotameter of the present invention are so proportioned that, when the bolts 46 draw the end walls 42 and the seating surfaces 44 into contact with each other, end-wise pressure is exerted upon the gaskets 54 which is sufficient to provide a fluid-tight seal between the ends of the tube 31 and the housing elements but which is not great enough to cause breaking or straining of the relatively frangible metering tube.

The housing elements 30 are provided with removable stop pins 55 which extend through generally horizontal apertures 56 across the central openings 33 of the housing elements; removable screw-threaded plugs 57 permitting side-wise insertion and removal of the pins. When the rotameter is assembled, the pins 55 extend horizontally just above and below the ends of the metering tube 31 and serve to limit the up-and-down movement of the metering float 32. In this way, the metering float 32 is kept within the confines of the metering tube 31 and is prevented from rising or falling into the apertures 33 of the housing elements 30.

In place of the separate pin 55 and plug 57, I may employ a stop pin 58, shown in Figure 20, in which the pin and threaded head are made integral.

Another form of stop pin is shown in Figure 21 in which a screw-threaded plug 59 adapted to be inserted within the opening 36 is provided with an inwardly extending stop pin portion 60 which limits the movement of the float.

The rotameter of the present invention is adapted to be quickly and easily connected within either horizontal or vertical pipe lines.

Thus, for example, where it is desired to measure the rate-of-flow of a fluid moving in a horizontal pipe-line from left to right in Figure 2, the plugs 38 are inserted within the vertically extending screw-threaded openings 36 of the housing elements 30—a and 30—b and the pipe-line is connected to the screw-threaded side openings 41 of the housing elements 30; the side opening of the lower element 30—a forming the inlet and the side opening of the upper inverted element 30—b forming the outlet of the rotameter. The fluid entering from the pipe-line at the inlet opening of the element 30—a passes through the conduit 39 and the central opening 33 of the housing element 30—a and passes upwardly into the cylindrical inner bore 48 of the metering tube 31. The upward pressure of the moving fluid lifts the metering float 32 upward within the tube beyond the lower ends of the flutes 49 whereupon the fluid enters the flutes, by-passing the float, and passes upwardly through the tube 31 beyond the float 32 into the central opening 33 and the conduit 39 of the upper inverted housing element 30—b finally to leave the rotameter through the side outlet opening of the element 30—b and to continue its flow in the pipe-line.

The height of the float 32 within the metering tube 31 is a measure of the rate-of-flow of the fluid, the greater the rate-of-flow, the greater the height of the float within the tube. That is, when the float is standing still at some point intermediate the ends of the tube, the pressure drop across the float of the rotameter is constant and is equal to the negative buoyancy of the float in the fluid. Upon any increase in the rate-of-flow, a momentary unbalance of pressure occurs (the pressure beneath the float becoming greater than the pressure above the float) whereupon the float is moved upward within the tube. But as the float is moved upward, a greater by-pass area is available to the fluid (due to the fact that the flutes become greater in cross-sectional area near the top of the tube) and the pressure unbalance is reduced so that the pressure-drop across the float again becomes relatively constant and the float remains relatively still at a higher position within the tube.

In this way, the height of the float within the tube is a direct indication of the rate-of-flow of the fluid. The rotameter can be calibrated for the particular fluid being metered so that the height of the float against the calibrations etched or otherwise applied to the outside of the tube 31 will be a direct reading of the rate-of-flow of the fluid. Or, instead, the calibrations applied to the outside of the tube can be an arbitrary scale, the reading of which will give the rate-of-flow of any one of several fluids by reference to suitable calibration and conversion tables.

Due to the fact that the flutes 49 do not extend to the bottom of the tube 31 so that the float, at rest, is in the cylindrical lowermost portion 52 of the tube 31, in which it has very slight clearance, even the slightest flow of fluid will be sufficient to raise the float 32 appreciably within the tube 31, so that the rotameter of the present invention is sensitive to very small flow-rates. On the other hand, the rotameter of the present invention has an unusually wide range due to the fact that the by-pass area presented by the flutes increases relatively rapidly as the float moves upward within the tube so that even at relatively large flow-rates the float does not rise beyond the upper end of the metering tube 31.

Where it is desired to measure the rate-of-flow of a fluid moving in a horizontal pipe-line from right to left in Figure 2, the rotameter is simply rotated around the imaginary axis of the metering tube horizontally so that the side inlet opening 41 of the lower metering element 30—a extends toward the right to receive the oncoming fluid from the pipe-line and so that the side outlet opening 41 of the inverted housing element 30—b extends toward the left of the rotameter; the functioning of the rotameter being the same as described hereinabove.

Where it is desired to measure the rate-of-flow of a fluid moving upwardly within a vertical pipe-line, the plugs 38 are removed from the vertically-extending screw-threaded openings 36 and are inserted within the side openings 41 of the housing elements 30; the pipe-line being connected into the openings 36 as shown in dotted lines in Figure 2. When the rotameter is so connected, the upwardly moving fluid will pass through the opening 33 of the lower housing element 30—a and into the metering tube 31, to by-pass the float 32 through the flutes 49, finally to leave the opening 33 of the upper housing element 30—b through the opening 36 thereof.

The rotameter of the present invention can also be so installed as to change the direction of flow of fluid in a pipe line. Thus, for example, it is possible to change from horizontal to vertical flow by connecting the horizontal pipe-line to the side inlet opening 41 of the housing element 30—a and by connecting the vertical pipe-line to the outlet opening 36 of the housing element 30—b; the opening 36 in the housing element 30—a and the opening 41 in the housing element 30—b being closed by the plugs 38. Similarly, it is possible to change from vertical to horizontal flow by connecting the vertical pipe-line to the inlet opening 36 in the housing element 30—a and by connecting the horizontal pipe-line to the outlet opening 41 in the housing element 30—b; the opening 41 in the housing element 30—a and the opening 36 in the housing element 30—b being closed by the plugs 38.

The housing elements 30 can be readily and inexpensively formed as single castings in which the necessary openings and conduits can be formed by drilling or other conventional operations.

Since the housing elements are identical and fully interchangeable, it is necessary to manufacture and to stock only a single type of housing element, which with the metering tube, gaskets and necessary bolts and plugs can easily be assembled and installed by any pipe-fitter or mechanic of average ability.

Rotameters, as heretofore used, have been relatively expensive and "made to order" in that each rotameter has been ordered according to the particular requirements of the proposed installation. Rotameters, being precision instruments, have heretofore been installed only by specially trained and skilled men and such installation has required specialized and relatively expensive fittings, etc. Thus, for example, a rotameter, as heretofore used, may consist of the metering tube, separate inlet and outlet "heads" or fittings, a plurality of supporting and spacing bolts or columns for the heads, stuffing boxes for enclosing the ends of the tube including packing and stuffing glands, bolts, etc. Where the fluid to be metered was passing through a horizontal pipe-line, rotameters as heretofore known required special piping arrangements since their inlet and outlet openings were at different levels.

As the result of these and other factors, rotameters, as heretofore known, have been sold only at prices which are too high to permit their use in many places where the inexpensive determination of the flow-rate of a fluid is desirable.

The rotameter of my present invention, on the other hand, employing as it does a single type of interchangeable housing element and eliminating the expensive stuffing-box, and greatly reducing the number of parts, as well as simplifying the installation thereof, can be sold and installed at a fraction of the cost of conventional rotameters. The advantages of the rotameters as a flow-rate indicator are thus, for the first time, made available in a large and varied field of industrial and home use in connection with the inexpensive determination of fluid flow-rate.

While so-called "one-piece" rotameters are known, the expression "one-piece" is misdescriptive of these oconventional rotameters, since the latter, in reality, are composed of an integral metal frame (having upper and lower heads and connecting columns), upper and lower separate metallic stuffing glands, upper and lower separate metallic gland followers and three or four packing rings in each stuffing box; that is, five metal parts (leaving aside connecting bolts and nuts and the like) and six or eight sealing elements. The rotameter of the present invention, on the other hand, has only two metal parts and two sealing elements (the gaskets at the ends of the metering tube).

In place of the metering tube 31 shown in Figures 1, 2 and 5, I may employ other types of fluted metering tubes such as, for example, those shown in Figures 9 to 12 and 13 to 15 of the drawings.

Thus, for example, I may employ the fluted tube 61 shown in Figures 9 to 12. The tube 61 has a cylindrical inner bore 62 generally similar to the inner bore 48 of the tube 31. However, the outer surface 63 of the tube 61 is made conical with a relatively slight downward taper.

A plurality (as for example 4) of flutes 64 are circumferentially disposed about the cylindrical inner bore 62 of said tube 61 and extend generally axially of said tube. Each of the flutes 64 is formed by a pair of plane radially-extending downwardly converging side walls 65 and a back wall 66 which is formed as a segment of a conical surface having its axis of curvature at the axis of the tube and being downwardly tapered at an angle more or less approximately parallel to the angle of taper of the outer conical surface 63.

Thus, the flutes 64 vary not only in circumferential dimension (as is the case with the flutes 49 of the tube 31) but also in radial depth; the flutes being large in circumferential and radial dimension near their tops as shown in Figure 10 and being small in both radial and circumferential dimension near their bottoms as shown in Figure 11. The flutes 64 terminate somewhat above the lower end of the tube 61 so that an unfluted cylindrical inner surface 67 is presented at the lowermost portion of the tube 61.

Still another form of metering tube is the tube 68 shown in Figures 13 to 16. The tube 68 has a cylindrical inner bore 69 and a cylindrical outer surface 70. A plurality (as for example 4) of flutes 71 are circumferentially disposed about the inner bore 69 and extend generally axially of the tube 68. Each of the flutes 71 (instead of being angle-cut as are the flutes of the metering tubes 31 and 61) is smoothly curved and is formed as a segment of a concavely conical surface having a downward taper. In this embodiment, the flutes 71 extend the entire axial dimension of the metering tube 68; the flutes being large and deep near the top of the tube as shown in Figure 14 and being small and shallow near the bottom of the tube as shown in Figure 15.

The rounded tapered flutes, instead of having the circular cross-section shown in Figures 13, 14 and 15, may be given any other smoothly-curved cross-sectional configuration, as for example the elliptical cross-section shown in Figure 16.

Instead of a fluted metering tube, I may employ the metering tube 72 shown in Figures 17, 18 and 19 which has a conical downwardly tapered inner bore 73 and a cylindrical outer surface 74.

The metering tubes 31, 61, 68 and 72 have been described hereinabove only by way of example and it is to be understood that the novel rotameter of my present invention may employ any metering tube which presents substantial end walls so as to permit end-wise gasketing between the tube and the housing elements.

The metering tubes employed with the rotameter of the present invention may be calibrated (by etching or otherwise) upon the outer surface, as shown in Figure 1 or upon the inner cylindrical bore, as shown in Figure 9 or both as shown in Figure 13; the dual calibration shown in Figure 13 being effective to prevent refractive error which might otherwise result from the thick wall of the metering tube if the float were viewed at an angle other than the horizontal.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. A rotameter comprising a vertical metering tube having a metering float adapted for free up-and-down movement therein, a pair of identical and interchangeable generally L-shaped elements constituting the end fittings as well as the frame for the metering tube, and means for detachably securing said elements directly to each other in operative relation to the ends of the metering tube, said frame having aligned horizontal openings therein whereby said rotameter can be connected directly within a horizontal pipe-line.

2. A rotameter comprising a vertical metering tube having a metering float adapted for free up-and-down movement therein, a pair of identical and interchangeable generally L-shaped elements constituting the end fittings as well as the frame for the metering tube, each of said elements having a conduit leading from an opening on the inner side thereof adapted for connection to one end of the metering tube and leading to an opening on the outer side thereof for connection to a pipe-line, and means for detachably securing said elements directly to each other and for simultaneously supporting said metering tube intermediate said elements with the ends of the tube disposed in fluid-tight relationship to the inner openings of said elements.

3. A rotameter comprising a vertical metering tube having a metering float adapted for free up-and-down movement therein, a pair of identical and interchangeable generally L-shaped juxtaposed elements detachably secured directly to each other to form the frame for the metering tube and constituting the end fittings thereof, said elements having aligned horizontal openings and conduits formed therein, said metering tube being supported intermediate said elements with the ends of the tube in fluid-tight sealing relationship to said conduits, said conduits forming a continuous passageway from said metering tube to said aligned openings.

4. A rotameter comprising a continuous frame formed by a pair of identical and interchangeable generally L-shaped juxtaposed elements detachably secured to each other, a vertical metering tube having a metering float therein and being supported intermediate said elements with the opposite ends of the tube in fluid-tight sealing relationship to connecting passageways formed in said elements, said passageways terminating in aligned horizontal outlets adapted for connection to a pipe-line, and a horizontal pin removably disposed within each of said elements, said pins providing top and bottom stops for said metering float.

5. A rotameter comprising a continuous frame formed by a pair of identical and interchangeable generally L-shaped juxtaposed elements detachably secured to each other, a vertical metering tube having a metering float therein and being supported intermediate said elements with the opposite ends of the tube in fluid-tight sealing relationship to connecting passageways formed in said elements, said passageways terminating in aligned oppositely extending horizontal outlets adapted for connection to a pipe-line.

6. A rotameter comprising a continuous frame formed by a pair of identical and interchangeable generally L-shaped juxtaposed elements detachably secured to each other, a vertical metering tube having a metering float therein and being supported intermediate said elements with the opposite ends of the tube in fluid-tight sealing relationship to connecting passageways formed in said elements, said passageways leading to aligned oppositely extending horizontal outlets and also to aligned oppositely extending vertical outlets, said horizontal outlets and said vertical outlets being adapted for alternative connection to a pipe-line.

7. A rotameter comprising a continuous frame formed by a pair of identical and interchangeable generally L-shaped juxtaposed elements, fastening means detachably connecting said juxtaposed elements and pulling said elements vertically together, a vertical metering tube disposed intermediate said elements and supported at its ends thereby, a pair of compressible annular sealing members disposed intermediate the ends of the tube and the adjacent portions of said elements, said sealing members being compressed upon fastening of said fastening means to provide a fluid-tight seal intermediate said elements and the ends of said tube, said elements having conduits formed therein leading from the ends of said tube and terminating in aligned oppositely extending horizontal outlets adapted for detachable connection in a pipe-line.

8. A rotameter comprising a frame formed of a pair of generally L-shaped housing elements of metal having conduits formed therein, means detachably connecting said housing elements, a relatively thick-walled metering tube having a freely-movable metering float therein and being vertically disposed intermediate said housing elements, said frame having aligned horizontal openings communicating with said metering tube through said conduits, and a pair of plane annular sealing members disposed intermediate said housing elements and the end walls of said metering tube, said sealing members being axially compressed upon fastening of said connecting means to provide a fluid-tight end-wise seal intermediate said metering tube and the conduits formed in said housing elements.

9. A rotameter adapted for connection directly into a horizontal pipe-line comprising a continuous frame formed by a pair of generally L-shaped housing elements of metal having conduits formed therein, said elements being detachably held in abutting relationship by connecting means, said housing elements having aligned oppositely extending horizontal openings communicating with said conduits and adapted for connection to the pipe-line or the like, and a metering tube having a freely-movable metering float therein and being vertically held intermediate said housing elements in fluid-tight sealing relationship with said conduits.

10. A rotameter comprising a continuous frame formed by a pair of identical and interchangeable generally L-shaped elements having conduits therein, means detachably connecting said elements in abutting relationship with each other, a metering tube having a metering float therein and being vertically disposed intermediate said frame elements, and a pair of annular compressible sealing members intermediate said frame elements and the ends of said metering tube, said annular sealing members being axially compressed upon fastening of said connecting means, to provide a fluid-tight seal between said metering tube and said conduits.

11. A rotameter comprising a continuous frame formed by a pair of identical and interchangeable generally L-shaped castings having conduits therein, means detachably connecting said castings in abutting relationship with each other, a metering tube having a metering float therein and being vertically disposed intermediate said frame castings, said frame having aligned horizontal openings therein communicating with said metering tube through said conduits, and a pair of annular compressible sealing members intermediate said frame castings and the ends of said metering tube, said annular sealing members being axially compressed upon fastening of said connecting means, to provide a fluid-tight seal between said metering tube and said conduits.

NATHANIEL BREWER.